(12) United States Patent
Fert

(10) Patent No.: US 8,607,578 B2
(45) Date of Patent: Dec. 17, 2013

(54) MOUNTING AN AGB ON AN INTERMEDIATE CASING FOR A TURBOJET FAN COMPARTMENT

(75) Inventor: Jeremy Edmond Fert, Paris (FR)

(73) Assignee: SNECMA, Paris (FR)

( * ) Notice: Subject to any disclaimer, the term of this patent is extended or adjusted under 35 U.S.C. 154(b) by 75 days.

(21) Appl. No.: 13/509,454

(22) PCT Filed: Nov. 16, 2010

(86) PCT No.: PCT/FR2010/052431
§ 371 (c)(1),
(2), (4) Date: May 11, 2012

(87) PCT Pub. No.: WO2011/061437
PCT Pub. Date: May 26, 2011

(65) Prior Publication Data
US 2012/0224950 A1 Sep. 6, 2012

(30) Foreign Application Priority Data
Nov. 17, 2009 (FR) ...................................... 09 58105

(51) Int. Cl.
*F02C 9/20* (2006.01)

(52) U.S. Cl.
USPC ......................................................... 60/797

(58) Field of Classification Search
USPC .................... 60/226.1, 796–797, 802; 244/54
See application file for complete search history.

(56) References Cited

U.S. PATENT DOCUMENTS

| 3,543,588 | A * | 12/1970 | Richardson .................... 74/15.8 |
| 6,260,351 | B1 * | 7/2001 | Delano et al. ................... 60/796 |
| 6,357,220 | B1 * | 3/2002 | Snyder et al. ................... 60/796 |
| 2006/0248900 | A1 | 11/2006 | Suciu et al. |
| 2009/0189014 | A1 | 7/2009 | Balk |

FOREIGN PATENT DOCUMENTS

| EP | 1 008 738 | 6/2000 |
| EP | 2 082 961 | 7/2009 |

OTHER PUBLICATIONS

International Search Report Issued Feb. 23, 2011 in PCT/FR10/52431 Filed Nov. 16, 2010.

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

An intermediate casing for a turbojet fan compartment, including: a shroud centered along a longitudinal axis of the turbine engine; an annular cheek plate centered along the longitudinal axis of the turbine engine and mounted against a downstream face of the shroud; a suspension beam fastened to the cheek plate and extending downstream parallel to the longitudinal axis of the turbine engine; and an AGB suspended from the beam and including an upstream side face spaced apart axially from the cheek plate, a downstream side face opposite the upstream side face, and a plurality of accessories mounted against its downstream side face and distributed about the longitudinal axis of the turbine engine.

8 Claims, 2 Drawing Sheets

MOUNTING AN AGB ON AN INTERMEDIATE CASING FOR A TURBOJET FAN COMPARTMENT

BACKGROUND OF THE INVENTION

The present invention relates to the general field of mounting an accessory driver unit on a turbojet.

In a turbojet, the accessories, such as the pumps for producing hydraulic energy, feeding fuel, and providing lubrication, and also the electricity generators for producing electrical power, etc. are grouped together within a unit commonly referred to as an accessory gearbox (AGB). Such a unit generally comprises one or more gear trains that are driven in rotation by power taken from a shaft of the turbojet and that are coupled to the various accessories.

In turbojets of the CFM® family, the AGBs are generally mounted in the zone or region of the fan compartment. More precisely, they are suspended from flanges formed on the metal blade-containment casing of said fan compartment.

However, the containment casings of fan compartments are being made more and more frequently out of a composite material in an attempt to save weight. Unfortunately, it is not easy to form flanges enabling an AGB to be attached on such casings made of composite material.

In addition, aircraft manufacturers require turbojets to supply ever higher levels of electrical power, which generally gives rise to two voluminous electricity generators being installed on the AGB. As a result, for an AGB mounted in the region of the fan compartment, the nacelle of the turbojet is enlarged in register with said AGB in order to limit the front area of the nacelle. Said enlargement nevertheless gives rise to aerodynamic impacts that are very penalizing in terms of performance.

In order to solve these problems, it is known to mount the AGB in the central compartment or "core" of the turbojet, and more particularly around the high-pressure compressor of the turbojet. However, that type of mounting leads to technical difficulties. In particular, installing a considerable load on the casing of the high-pressure compressor risks reducing the performance of said casing because of a phenomenon of ovalization of the casing (ovalization has a correspondingly greater effect when the diameter of the compressor casing is small). Furthermore, the presence of air tubes for discharging air upstream from the high-pressure compressor during some stages of flight limits the possibilities of attaching the AGB on components of the core compartment, other than on the casing of the high-pressure compressor.

OBJECT AND SUMMARY OF THE INVENTION

The main aim of the present invention is therefore to overcome such drawbacks by providing a way of mounting an AGB in the core compartment of the turbojet without degrading the performance of the high-pressure compressor of the turbojet.

This aim is reached by means of an intermediate casing for a turbojet fan compartment, comprising:
- a shroud centered along a longitudinal axis of the turbine engine;
- an annular cheek plate centered along the longitudinal axis of the turbine engine and mounted against a downstream face of the shroud;
- a suspension beam fastened on the cheek plate and extending downstream parallel to the longitudinal axis of the turbine engine; and
- an AGB suspended from the beam and comprising an upstream side face spaced apart axially from the cheek plate, a downstream side face opposite the upstream side face, and a plurality of accessories mounted against its downstream side face and distributed about the longitudinal axis of the turbine engine.

The intermediate casing of a turbojet is positioned between the low-pressure compressor and the high-pressure compressor. Also, the AGB that is suspended from a beam fastened on the cheek plate of the intermediate casing may be arranged around the high-pressure compressor of the turbojet without being directly fastened thereto. Any risk of reducing the performance of the casing of the high-pressure compressor by ovalization is thus removed. In addition, mounting the AGB in accordance with the invention makes it possible to move the AGB away from the cheek plate of the intermediate casing in such a manner as to be able to leave a space for passing air tubes for discharging air upstream from the high-pressure compressor.

In an advantageous arrangement, the AGB is fastened at one end to the beam and at its opposite end to a yoke that is fastened to the cheek plate, the casing further comprising a fuel unit fastened at one end to the yoke of the cheek plate and at its opposite end to the beam. The addition of the fuel unit thus makes it possible to form with the AGB, a full circle centered on the longitudinal axis of the turbojet, which facilitates balancing weights in optimum manner about said longitudinal axis. In addition, each AGB may be removed independently of the others, and that facilitates maintenance thereof.

In this event, the fuel unit may comprise an upstream side face spaced apart axially from the cheek plate, a downstream side face opposite the upstream side face, and a plurality of pieces of fuel-handling equipment mounted against its downstream side face.

Preferably, the AGB further comprises a transfer unit mounted against its upstream side face.

Still preferably, the casing further comprises at least one axial force take-up link fastened at one end to the cheek plate and at its opposite end to the upstream side face of the AGB.

The accessories of the AGB may comprise: at least one electricity generator for supplying electrical power to the airplane; an alternator for supplying electricity to electrical equipment of the turbine engine; a starter for starting the turbine engine; at least one hydraulic pump for supplying hydraulic power to the airplane; a fuel pump; and a lubricant pump.

The invention also relates to a fan compartment for a turbojet comprising a containment casing centered on the longitudinal axis of the turbine engine and an intermediate casing as defined above, and fastened to the containment casing.

The invention further relates to a turbojet including an intermediate casing as described above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
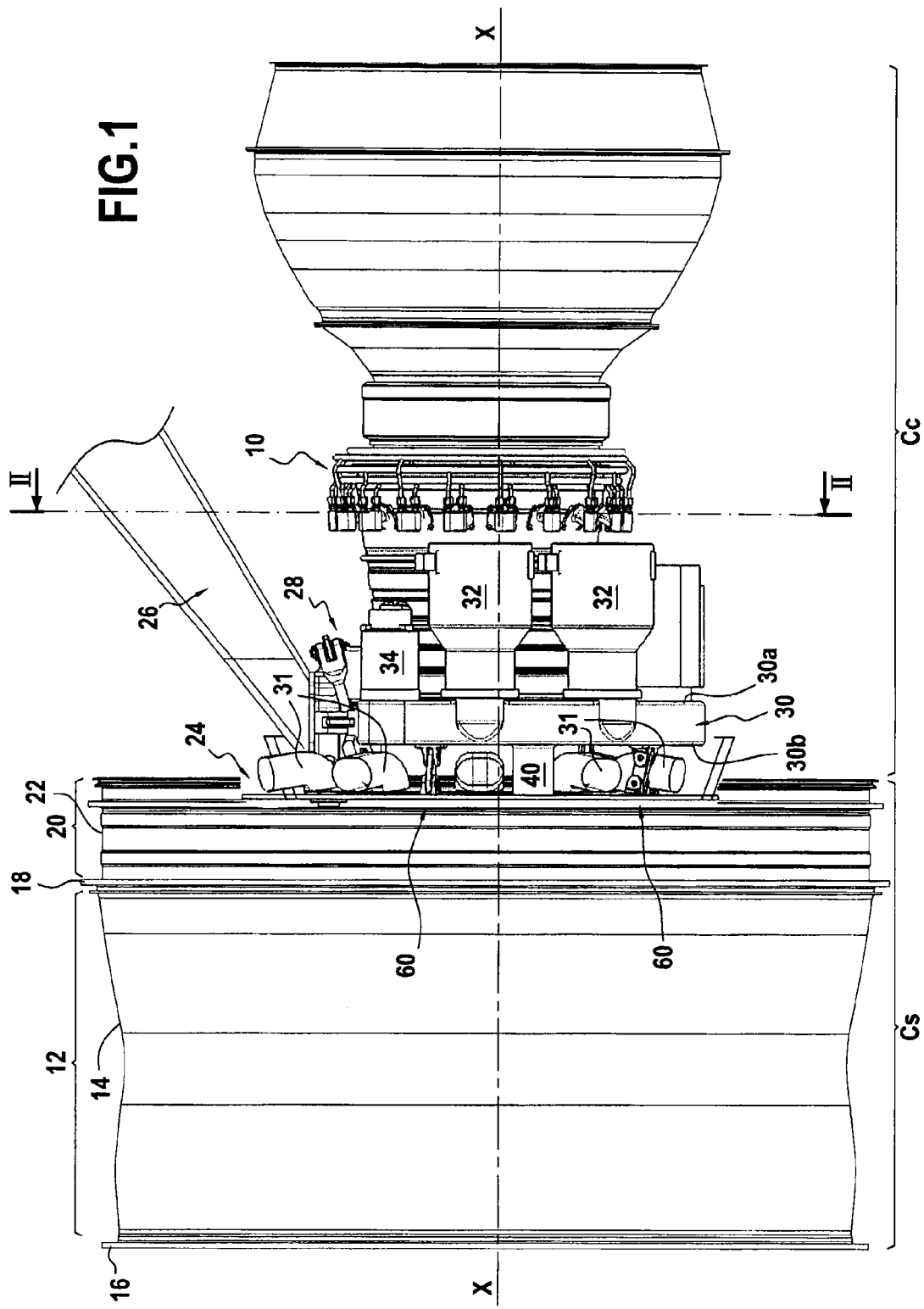
FIG. 1 is a side view of a turbojet fitted with an intermediate casing of the invention.

FIG. 1 is a side view showing a turbojet 10 of the two-spool bypass turbojet type, fitted with an intermediate casing of the invention. Naturally, the field of application of the invention extends to other types of turbojet.

In known manner, such a turbojet 10 is made up of an upstream compartment in which the fan is housed, also called the fan compartment $C_S$, and a downstream compartment in which the remainder of the turbojet is housed, also called the "core" $C_C$, or central compartment.

More precisely, the fan compartment $C_S$ includes a blade-containment casing 12 that is made up of a shroud 14 (preferentially made out of composite material) centered on the longitudinal axis X-X of the turbojet and provided at both of its ends with flanges, namely an upstream flange 16 and a downstream flange 18.

Figure 2:
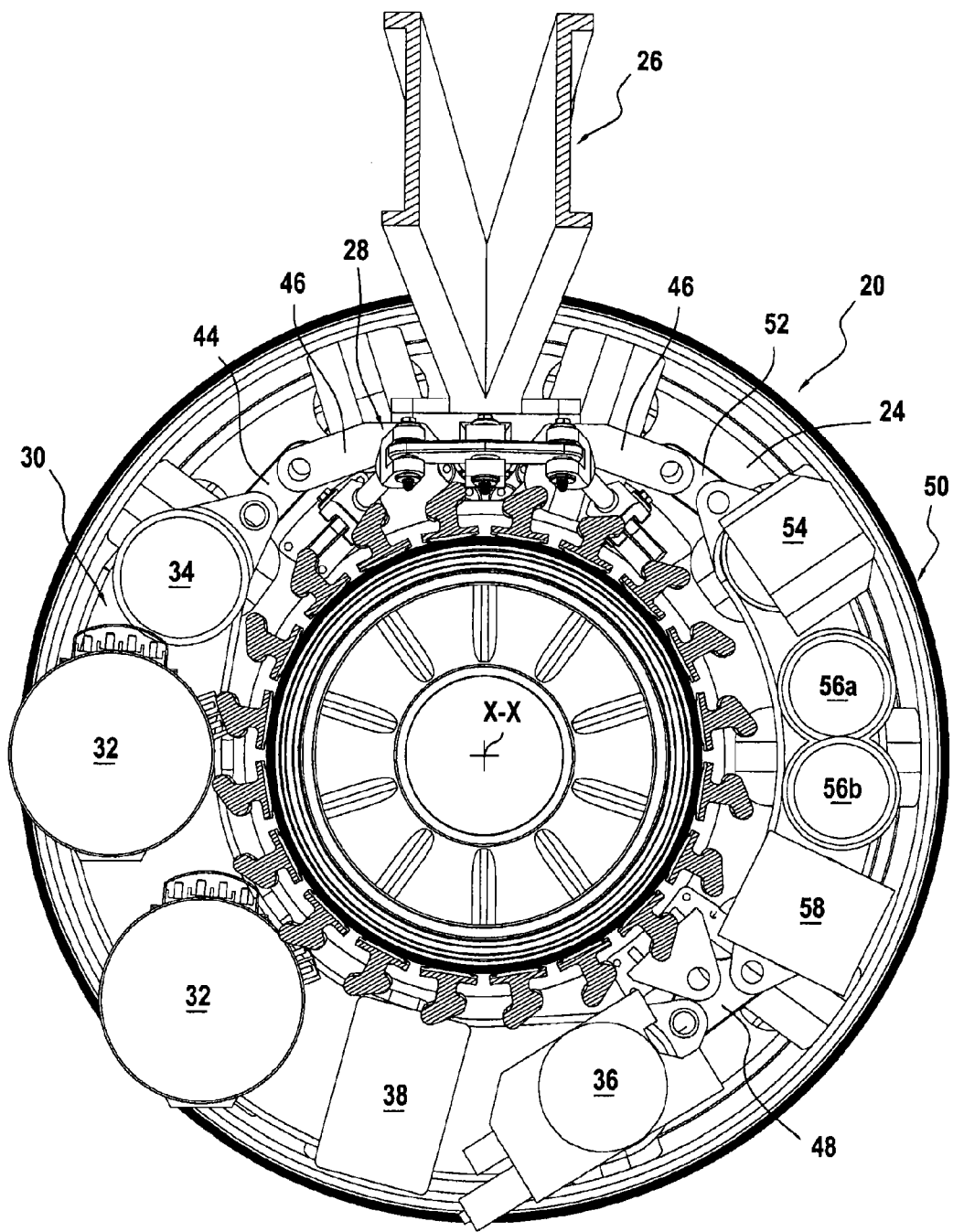
FIG. 2 is a section view along II-II of FIG. 1.

The fan compartment also includes an intermediate casing 20 fastened to the downstream flange 18 of the containment casing 12. Said intermediate casing is made up of a metal shroud 22 that is centered on the longitudinal axis X-X of the turbojet and of an annular cheek plate 24 also centered on the longitudinal axis X-X and mounted against a downstream face of the shroud 22 (FIG. 2).

In addition, the turbojet 10 is suspended from an airplane wing (not shown) by means of a pylon 26, said pylon being connected to the turbojet by means of a suspension beam 28 fastened to the cheek plate 24 of the intermediate casing 20. This suspension beam extends downstream parallel to the longitudinal axis X-X of the turbojet.

According to the invention, provision is made to use said suspension beam 28, designed for fastening the pylon 26, to suspend the accessory gearbox (AGB) 30 of the turbojet, the AGB being more precisely positioned around the high-pressure compressor of the turbojet.

The AGB 30 includes a downstream side face 30a that is substantially plane and an upstream side face 30b that is substantially plane and opposite from the downstream side face. The presence of the suspension beam makes it possible to space the AGB axially apart from the cheek plate of the intermediate casing. Thus, the space that is left between these two elements makes it possible to pass air tubes 31 therethrough in order to discharge air upstream from the high-pressure compressor of the turbojet.

In addition, the AGB 30 encloses one or more gear trains (not shown) that are driven in rotation by taking power from a shaft of the turbojet. A plurality of accessories are mounted against the downstream side face 30a of the AGB 30 and each of them presents a drive shaft that is coupled to one of the gears of the AGB. These drive shafts (not shown in the figures) extend along a direction that is substantially parallel to the longitudinal axis X-X.

Amongst these accessories, there are provided two electricity generators 32 for supplying electrical power to the airplane; an alternator 34 for supplying electricity to electrical equipment of the turbine engine; a starter (not shown) for starting the turbine engine; a hydraulic pump (not shown) for supplying hydraulic power to the airplane; a fuel pump 36; and a lubricant pump 38. Naturally, accessories other than those mentioned above may be mounted on the AGB.

In addition, the AGB 30 includes a transfer unit 40 (FIG. 2) through which the shaft taking power from the shaft of the turbojet passes, thereby making it possible to drive the various accessories. Said transfer unit 40 is preferably mounted against the upstream side face 30b of the AGB.

At one of its ends, the AGB 30 is fastened to a suspension link 44, said suspension link itself being fastened to a transverse bar 46 forming a cross-piece and being secured to the suspension beam 28. At the opposite end, the AGB 30 is connected to a yoke 48 fastened to the cheek plate 24 of the intermediate casing 20.

In a particularly advantageous arrangement, the intermediate casing further includes a fuel unit 50 that is fastened at one end to the yoke 48 of the cheek plate 24, and at the opposite end to the suspension beam 28 (via a suspension link 52 fastened to the transverse bar 46).

The fuel unit 50 comprises an upstream side face spaced apart axially from the cheek plate, a downstream side face opposite the upstream side face, and a plurality of pieces of fuel-handling equipment mounted against its downstream side face. By way of example, such equipment comprises a control unit 54 for controlling actuator servovalves, a group of exchangers and oil/fuel filters 56a, 56b, and a fuel metering valve 58.

Together the AGB 30 and the fuel unit 50 thus form an assembly occupying a full circle that is centered on the longitudinal axis X-X of the turbojet. The accessories/equipment of this assembly are distributed about said longitudinal axis X-X and arranged around a core compartment of the turbojet, and more particularly around the high-pressure compressor. Thus, weights may be balanced in optimum manner about said longitudinal axis X-X. In addition, each unit (the AGB or the fuel unit 50) may be removed independently of the other, thereby facilitating maintenance thereof.

As shown in FIG. 1, axial force take-up links 60 may be fastened at one of their ends to the cheek plate 24 of the intermediate casing and at their opposite ends to the upstream side face 30b of the AGB 30.

In the above description of the intermediate casing of the invention, the AGB is suspended from a suspension beam that is normally used for fastening the pylon. Such an embodiment presents the advantage that the suspension beam for fastening the pylon is dimensioned to support loads that are much greater than suspending the AGB. In addition, since said suspension beam is already present, modification of its shape has a negligible impact on the overall weight of the turbojet.

However, some turbojets have a different system for attaching the pylon in which a suspension beam that is fastened to the intermediate casing of the fan compartment is not provided. Naturally, in this configuration it is obvious that such a suspension beam could be installed on the cheek plate of the intermediate casing so as to suspend the AGB that is mounted in accordance with the invention.

The invention claimed is:

1. An intermediate casing for a turbojet fan compartment, comprising:
   a shroud centered along a longitudinal axis of a turbine engine;
   an annular cheek plate centered along the longitudinal axis of the turbine engine and mounted against a downstream face of the shroud;
   a suspension beam fastened to the cheek plate and extending downstream parallel to the longitudinal axis of the turbine engine; and
   an accessory gearbox (AGB) suspended from the beam and comprising an upstream side face spaced apart axially from the cheek plate, a downstream side face opposite the upstream side face, and a plurality of accessories mounted against its downstream side face and distributed about the longitudinal axis of the turbine engine.

2. A casing according to claim 1, wherein the AGB is fastened at one end to the beam and at its opposite end to a yoke that is fastened to the cheek plate,
   the casing further comprising a fuel unit fastened at one end to the yoke of the cheek plate and at its opposite end to the beam.

3. A casing according to claim 2, wherein the fuel unit comprises an upstream side face spaced apart axially from the cheek plate, a downstream side face opposite the upstream side face, and a plurality of pieces of fuel-handling equipment mounted against its downstream side face.

4. A casing according to claim 1, wherein the AGB further comprises a transfer unit mounted against its upstream side face.

5. A casing according to claim 1, further comprising at least one axial force take-up link fastened at one end to the cheek plate and at its opposite end to the upstream side face of the AGB.

6. A casing according to claim 1, wherein the accessories comprise:
- at least one electricity generator for supplying electrical power to the airplane;
- an alternator for supplying electricity to electrical equipment of the turbine engine;
- a starter for starting the turbine engine;
- at least one hydraulic pump for supplying hydraulic power to the airplane;
- a fuel pump; and
- a lubricant pump.

7. A fan compartment for a turbojet comprising:
- a containment casing centered on the longitudinal axis of the turbine engine; and
- an intermediate casing according to claim 1, the intermediate casing being fastened to the containment casing.

8. A turbojet comprising an intermediate casing according to claim 1.

* * * * *